Aug. 4, 1970     E. P. KNAPP     3,522,730
MULTICHARACTERISTIC MAXIMUM ALLOWABLE AIRSPEED INDICATOR
Filed Oct. 22, 1968     4 Sheets-Sheet 1
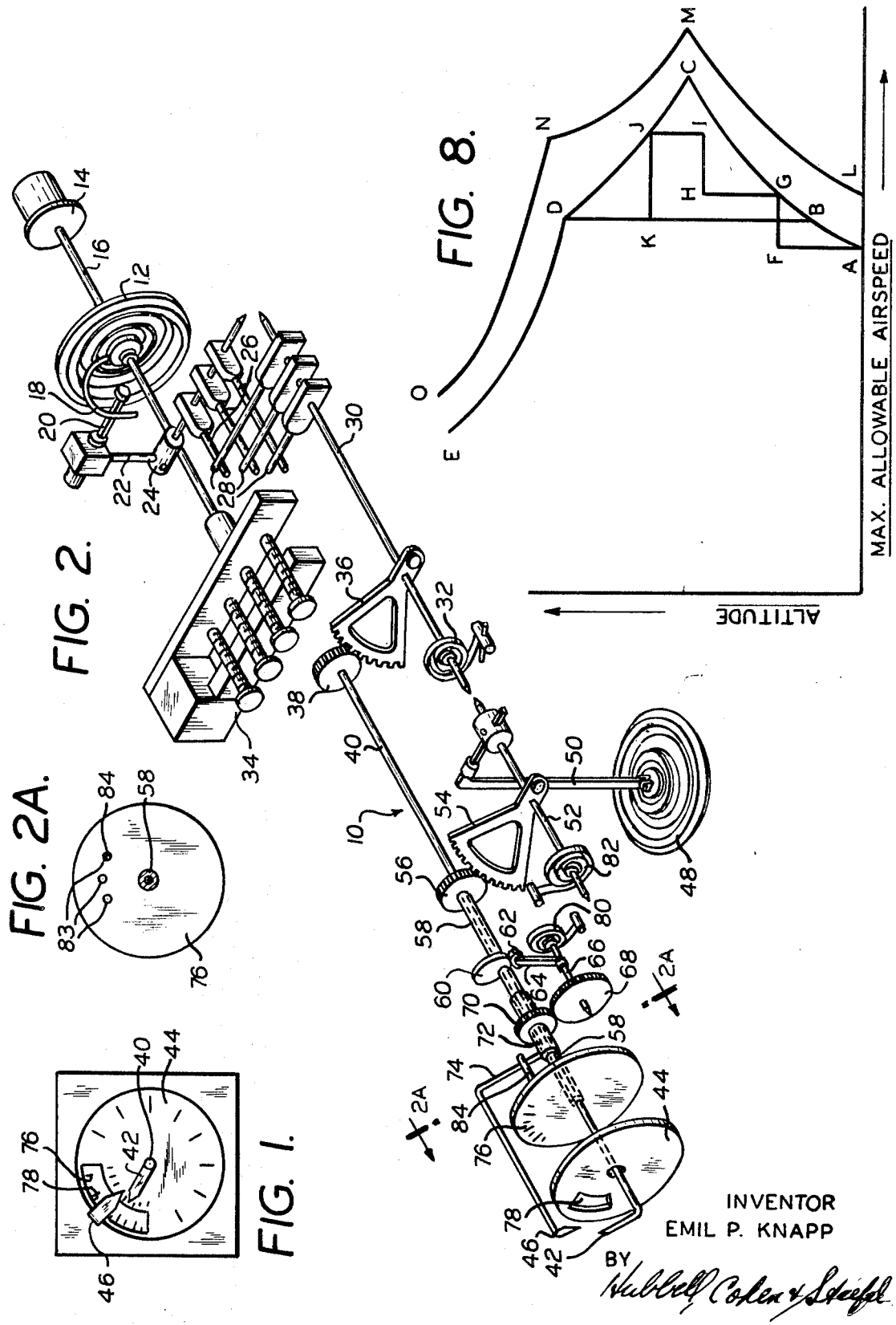
INVENTOR
EMIL P. KNAPP
BY
Hubbell, Cohen & Steifel
ATTORNEYS.

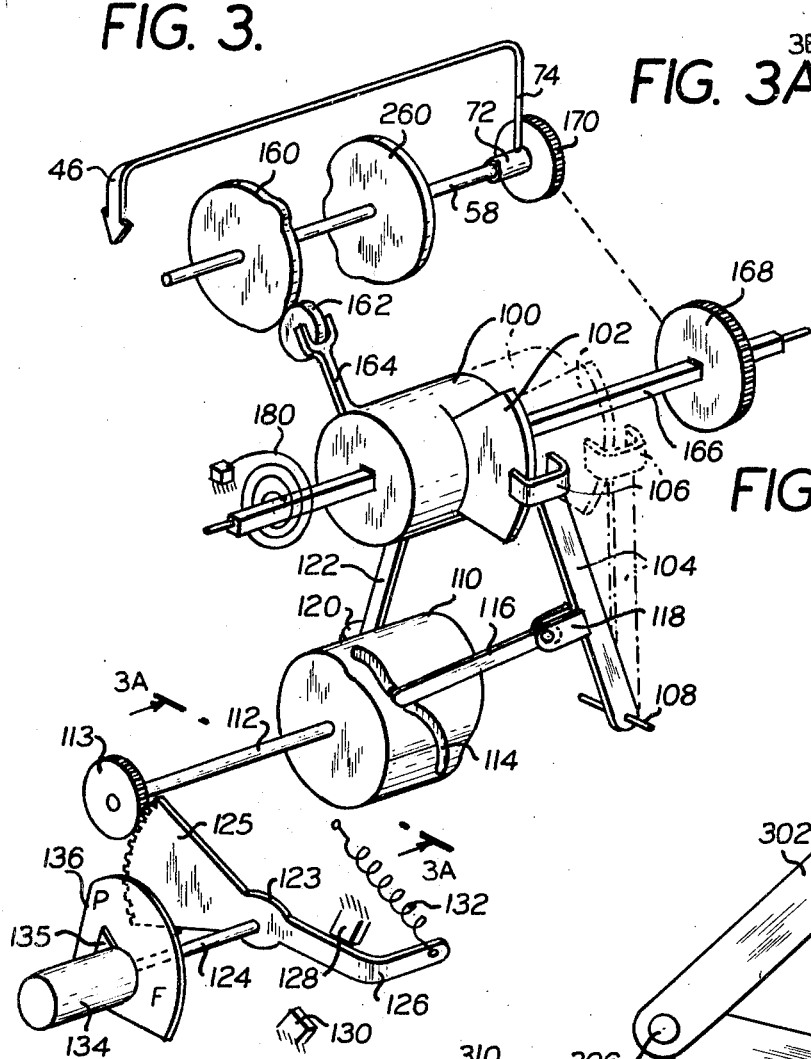
FIG. 3.
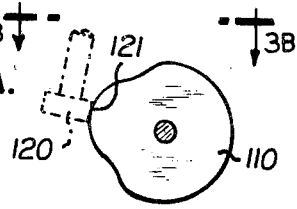
FIG. 3A.
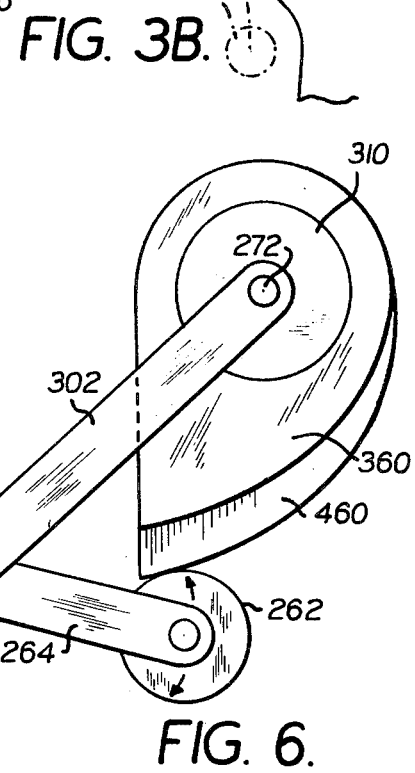
FIG. 3B.
FIG. 6.
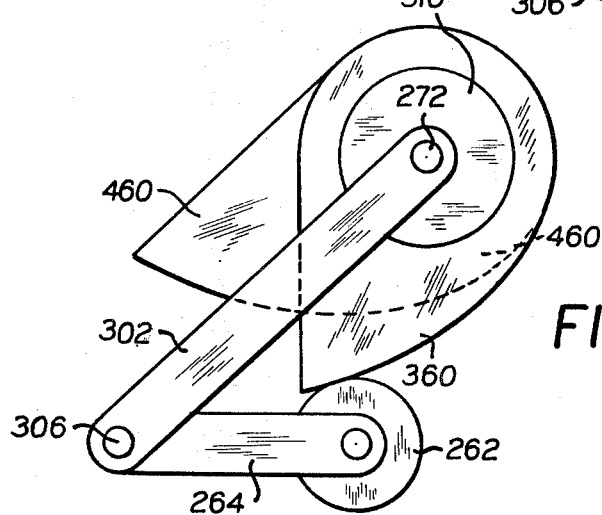
FIG. 7.
INVENTOR
EMIL P. KNAPP
ATTORNEYS.

Aug. 4, 1970     E. P. KNAPP     3,522,730
MULTICHARACTERISTIC MAXIMUM ALLOWABLE AIRSPEED INDICATOR
Filed Oct. 22, 1968     4 Sheets-Sheet 3

INVENTOR
EMIL P. KNAPP
BY
ATTORNEYS.

INVENTOR
EMIL P. KNAPP

{ # United States Patent Office 3,522,730
Patented Aug. 4, 1970

3,522,730
MULTICHARACTERISTIC MAXIMUM
ALLOWABLE AIRSPEED INDICATOR
Emil P. Knapp, New Fairfield, Conn., assignor to Lear
Siegler, Inc., Armonk, N.Y., a corporation of Delaware
Filed Oct. 22, 1968, Ser. No. 769,529
Int. Cl. G01p 5/00
U.S. Cl. 73—182                                   16 Claims

ABSTRACT OF THE DISCLOSURE

Maximum allowable airspeed pointer mechanism including multiplicity of pointer driving devices. Each of the devices includes a cam mechanism shaped in accordance with the maximum allowable airspeed of particular aircraft in particular use. A selector arrangement is provided for selectively rendering operative particular pointer driving devices to be responsive to a static pressure capsule.

BACKGROUND OF THE INVENTION

Field of the invention

The invention relates in general to a new and simplified maximum allowable airspeed indicator, for use either alone or as a part of an airspeed or combined airspeed and mach indicator. In one preferred embodiment it relates to an airspeed indicator having a maximum allowable airspeed pointer associated therewith which indicates the maximum safe airspeed for an aircraft as a function of an environmental parameter of the aircraft such as, for example, altitude. In another preferred embodiment, the invention relates to a combined airspeed and mach indicator having a maximum allowable airspeed pointer associated therewith.

Description of the prior art

In flying, it is essential for the safety of both the pilot and the aircraft that the safe maximum airspeed of the particular aircraft not be exceeded. In airspeed indicators and combination mach and airspeed indicators, it is customary to include a pointer which indicates the maximum safe airspeed for the aircraft. This pointer may be stationary or it may move as a function of some parameter, generally altitude.

As is well known in the art, the maximum allowable airspeed characteristic is generally different for each type of aircraft and usually varies non-linearly, for at least a portion of the curve, as a function of an external parameter, typically altitude. Moreover, the maximum allowable airspeed characteristics of some aircraft will change upon a transformation in use, as from passenger to cargo service. In many types of aircraft, the maximum allowable airspeed may, at least for a portion of the curve, be a function of different mach numbers. As is known, the airspeed for a given mach number varies non-linearly with altitude.

In order to provide maximum efficiency of flight and to allow pilots to fly at or near the maximum safe airspeed at any altitude, it is most desirable to provide on an airspeed instrument or on a combined airspeed and mach indicator a pointer which indicates the actual maximum allowable airspeed at any altitude in flight and not merely an arbitrary fixed maximum allowable airspeed. Because of the non-linear nature of the maximum airspeed as a function of altitude, means must be provided to non-linearly translate changes in altitude to maximum allowable airspeed readings. Also, because this non-linear variation is different for different types of aircraft, it is necessary to provide different such means for each such aircraft. In addition, because of the change in the maximum allowable airspeed characteristic of a particular aircraft upon a change in service, as from passenger to cargo service, it is desirable to provide different such means for each such service, as well as means for selecting the desired one of such means for the desired service.

The heretofore known mechanical means for obtaining these desired results consist of relatively complicated structures as, for example, crank and lever assemblies, linkages, as typified by U.S. Pat. No. 3,257,846, issued on June 28, 1966, to C. M. Hunter and countermoving means driven by gears such as maximum allowable pointer 60 and mach sub-dial 36 of U.S. Pat. No. 2,706,407, issued Apr. 19, 1955, to N. F. Hosford. The use of such prior known assemblies or structures for imparting a non-linear movement to a maximum airspeed pointer involves relative difficulty in fabrication and assembly, costliness of manufacture, and difficulty, if not impossibility, of adjustment once the assemblies were installed in the instrument. In addition, with such prior art assemblies, a separate maximum allowable airspeed indicating mechanism has to be designed for each type of aircraft in order to take into account the unique maximum allowable airspeed characteristics of the craft. And, further, separate means have to be provided in the event of a change from passenger to cargo service.

Moreover, these prior art devices all lack the ability to give a true maximum allowable airspeed reading over the entire maximum allowable airspeed curve for most aircraft. Considering the typical curves illustrated in FIG. 8 of the accompanying drawings, it will be seen that below a certain altitude, D, the curve for maximum allowable airspeed is often irregular (ABCD or ABD) whereas above that altitude it is often identical to the curve of a fixed mach number. The prior art instruments can usually give accurate readings for altitudes above D but are limited to either straight-line curves BD, or, in the case of the variable ratio crank and lever assembly, a stepped curve AFGHIJKD, for altitudes below D. In either case, the indicated maximum allowable airspeed is less than the true maximum allowable airspeed for a large portion of the flight. This causes the pilot to fly at less than the maximum allowable airspeed. The resulting loss in airspeed results in a loss of efficiency and in increased cost of operation of commercial flights. By contrast, the device of the present invention, by employing tailored cams, for the first time indicates true maximum allowable airspeed over the entire flight and thereby permits much more efficient aircraft operation.

A more detailed discussion of the variation of maximum allowable airspeed with altitude is not deemed necessary to an understanding of this invention. However, such a discussion, as well as a description of other means for indicating maximum allowable airspeed, may be found in U.S. Pat. 3,205,708 issued Sept. 14, 1965, to John H. Andresen and assigned to the assignee hereof.

In my prior application Ser. No. 603,079, filed Nov. 29, 1966, now Pat. No. 3,435,675, the contents of which are hereby incorporated herein by reference, I have disclosed a construction by virtue of which the same basic instrument can be employed for many different aircraft to indicate accurately the maximum allowable airspeed for a particular aircraft at any point in flight. That construction essentially comprises a maximum allowable airspeed pointer operatively associated with a standard airspeed dial of an airspeed instrument or a combined airspeed and mach indicator, an external parameter sensing means, for example an altitude capsule, mechanically connected to the pointer to effect movements in the pointer corresponding to pressure changes in the capsule caused by changes in altitude, and cam means interposed in the connecting means and including a data cam shaped to yield a nonlinear movement of the pointer with changes in altitude, which movement along the airspeed dial corresponds to changes in maximum allowable airspeed for the particular aircraft. Thus, one form or type of instrument may be manufactured for use in a number of different types or models of aircrafts. All that must be done to suit the instrument to a particular type of aircraft is to select and insert the appropriate data cam which is contoured to reflect the maximum allowable airspeed curve for the particular aircraft. Clearly the adaptation of a used instrument constructed for one type of aircraft to another type of aircraft will require the substitution of a new data cam for the old data cam. In accordance with a preferred feature disclosed in that application, stop means are also provided for selectively limiting the movement of the cam follower over a given portion of the data cam for those aircraft wherein conversion of the aircraft from passenger to cargo use results in a change in a portion only of the maximum allowable airspeed characteristics, which change is a reduction of maximum allowable airspeed to a (lower) constant value over the altitude range corresponding to greatest maximum allowable airspeed during passenger use.

SUMMARY OF THE INVENTION

The present invention provides an improvement over the construction of said application Ser. No. 603,079, for use on aircraft whose maximum allowable airspeed characteristics in different types of service do not coincide over any significant portion of flight as well as for aircraft wherein there may be more than two different maximum allowable airspeed characteristics depending on the use to which the aircraft is put. In one aspect, the construction of the present invention comprises a plurality of data cams, each separately tailored to reflect the maximum allowable airspeed characteristics of a given type of aircraft in a particular service, and means for selectively bringing the data cam which is tailored to the desired service of the given aircraft into operative connection with means for moving a maximum allowable airspeed pointer on a standard airspeed dial of an airspeed instrument or a combined airspeed and mach indicator and with external parameter sensing means such as an altitude capsule. For simplicity of description, the invention will generally be described hereinafter with reference to two such data cams, but it will be understood that the invention could be, applied to, and is intended to encompass instruments having three or more such data cams, as needed.

In another aspect, the invention provides means, independent of the cam means, for rotating the maximum allowable airspeed indicator together with the mach dial for that portion of the maximum allowable airspeed curve (for example, DE on FIG. 8) in which maximum allowable airspeed is a direct function of mach.

BRIEF DESCRIPTION OF THE DRAWINGS

In the drawings:

FIG. 1 is a front elevational view of the dial of a combined airspeed and mach indicator instrument embodying the present invention and showing the airspeed pointer and the maximum allowable airspeed pointer;

FIG. 2 is a perspective view of the mechanism of a combined airspeed and mach instrument embodying one form of the present invention;

FIG. 2A is a sectional view taken along the line 2A—2A of FIG. 2;

FIG. 3 is a perspective view of a portion of the mechanism of an airspeed instrument embodying another form of the present invention;

FIG. 3A is a sectional view taken along the line 3A—3A of FIG. 3;

FIG. 3B is a sectional view taken along the line 3B—3B of FIG. 3A;

FIG. 6 is a detail view of a portion of the mechanism of FIG. 5, showing one of the data cams in engagement with the cam follower;

FIG. 7 is a detail view similar to FIG. 6, showing the other of the data cams in engagement with the cam follower; and FIG. 8 is a graph illustrating typical maximum allowable airspeed curves for aircraft, showing different possible types of variation of said curves upon conversion of the aircraft from passenger to cargo use.

DESCRIPTION OF THE PREFERRED EMBODIMENTS

Figure 4:
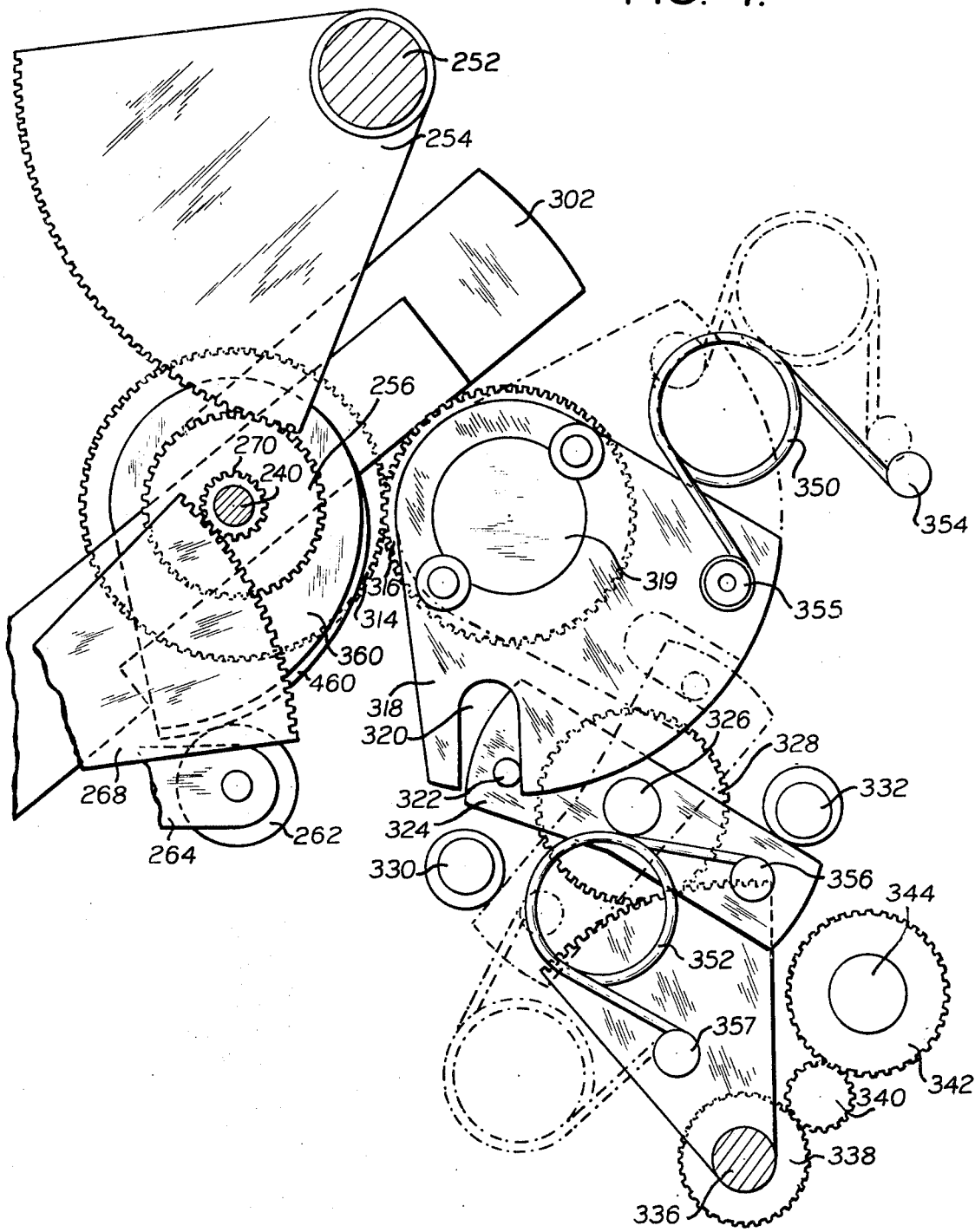
FIG. 4 is an enlarged plan view, partially in section, of a portion of the mechanism of an airspeed instrument embodying yet another form of the present invention.

Referring now to FIGS. 1 and 2 of the drawings in detail, the combined mach and airspeed instrument is designated generally by the reference numeral 10.

The combined mach and airspeed instrument 10 includes an airspeed capsule 12 which is connected to a pitot pressure source 14 by a pipe or conduit 16. As the capsule 12 expands and contracts, a U-shaped output member 18 moves back and forth in the direction of the longitudinal axis of the instrument 10. The member 18 is in engagement with an arm 20 (which may also be a temperature compensation means as by making it a bimetal) which arm 20 extends outwardly from a rod 22 fixed to a rotatable shaft 24, which is journaled in end bearings that are not shown. Extending radially from the shaft 24 are one or more levers 26 which are in cooperative engagement with one or more levers 28 which are secured to a rotatable shaft 30. The shaft 30 is rotatably journaled in end bearings (not shown) and is biased by a spring 32 in a counterclockwise direction whereby to bias the arm 20 into a continuous operative engagement with the member 18. Accordingly, as the member 18 moves back and forth, the shaft 24 will rock about its axis. The interconnecting levers 26 and 28 form no part of the present invention per se and any other form of interconnecting linkage may be employed in the present invention. The specific nature of the interconnecting linkage 26 and 28 is more fully described in U.S. Pat. 3,257,845 granted on June 28, 1966 to John H. Andresen, Jr. and Emil P. Knapp and assigned to the assignee hereof. It will also be noted that preferably associated with the capsule 12 is a calibrating means 34 which forms no part of the present invention and which may be deleted if desired. However, if a full explanation of the calibrating means 34 is desired, reference may be had to the aforementioned Pat. No. 3,257,845.

Fixed to shaft 30 is a gear segment 36 which is in meshed relation with a gear 38 mounted on a shaft 40 to which an airspeed pointer 42 is also secured. The airspeed pointer is disposed in operative relation with an indicia bearing plate 44 which carries airspeed indicia thereon. It will be obvious that as the air speed of the aircraft varies, the pressure in capsule 12 will vary to cause an expansion and contraction of the capsule 12 which expansion and contraction will cause in turn a longitudinal movement of member 18 which movement will result in a rocking movement of the shaft 24 and, through the levers 26, 28, there will be a rocking movement of the shaft 30, which rocking movement will be converted by the gear 36 and the gear 38 into rotational movement of the shaft 40 and the airspeed pointer 42. As the airspeed pointer moves, it will point to different airspeed indicia on the indicia plate 44 whereby to indicate a changed airspeed.

Also associated with the indicia plate 44 is a maximum allowable airspeed pointer 46. In accordance with this invention, pointer 46 is connected to a conventional static pressure capsule 48 in such manner that movements of the capsule caused by pressure changes due to changes in altitude are converted to a corresponding movement of the pointer to indicate the maximum allowable airspeed of the aircraft at the changed altitude.

In the illustration of FIG. 2, this connection comprises a vertical crank 50 connected to the capsule 48, crank 50 being connected by conventional means to a horizontal shaft 52 which is rotatably journaled in bearings which are not shown. Mounted on shaft 52 is a segment of a gear 54 which is in meshed relationship with an associated gear 56. Gear 56 is mounted on a sleeve 58 which is coaxial with shaft 40 and which carries thereon a data cam 60. As explained above, the data cam 60 is shaped to reflect the maximum allowable airspeed characteristics of the aircraft on which the instrument is mounted (for the dominant service in which the aircraft is intended to be used).

Associated with data cam 60 is a cam follower 62 which is biased against the data cam surface by a spring 80 as will be seen hereinafter. Cam follower 62 is mounted on a crank 64 which is in turn connected to a shaft 66 which is offset from and parallel to shaft 40 and sleeve 58. Shaft 66 has mounted thereon a gear 68 which is in meshed relationship with a gear 70 mounted on a separate sleeve 72 which sleeve 72 is coaxial with sleeve 58 and has mounted thereon one end of a rod 74. The maximum allowable airspeed pointer 46 is fixed to the other end of rod 74. Also mounted on shaft 58 is a mach subdial 76. Mach subdial 76 is calibrated with indicia for providing a mach readout through a cut-out 78 in indicia plate 44.

The spring 80 biases shaft 66 counterclockwise to therefore bias the cam follower into engagement with data cam 60. An anti-backlash spring 82 is provided on shaft 52 to normally urge shaft 52 in a clockwise direction, thereby eliminating any backlash in vertical crank 50.

A peg 84 is mounted on mach subdial 76 for engaging rod 74 at that point in flight when maximum allowable airspeed becomes a direct or linear function of mach. To provide for interchangeability of the instrument for use on different types of aircraft, mach subdial 76 may be provided with a series of recesses 83 into which peg 84 may be fastened, for example, by being press fitted, the particular recess to be employed being selected in accordance with the flight characteristics of the aircraft on which the instrument is used. That is, peg 84 would be so positioned on subdial 76 that it would engage rod 74 at that point in flight at which the maximum allowable airspeed characteristic of the aircraft on which the instrument were mounted became a direct or linear function of mach. Each position or recess 83 would represent a different direct function of mach; e.g., .80 mach, .85 mach, .90 mach.

In operation, a change in altitude of the aircraft would set in motion a corresponding change in position of the maximum allowable airspeed pointer 46 as described below with particular reference to FIG. 2. Assuming the altitude is increased, the corresponding drop in static pressure will cause an expansion of the static pressure capsule 48, which expansion will in turn cause an upward movement of the crank 50. This upward movement of crank 50 will cause a clockwise rotation of shaft 52 which will in turn be converted, through gears 54 and 56, into a counterclockwise rotation of shaft 58 and both data cam 60 and mach subdial 76 mounted thereon. The rotation of data cam 60 will cause a displacement of cam follower 62, the amount and direction of which will depend on the particular configuration of the cam surface at that portion of the cam 60 on which the cam follower 62 is resting. As explained, this configuration depends on the maximum allowable airspeed characteristics of the aircraft. The displacement of cam follower 62 will, in turn, be converted into a corresponding displacement of maximum allowable airspeed pointer 46 as described in detail below.

If the rotation of data cam 60 results in an increase in the radius thereof at the point of contact with cam follower 62, then cam follower 62 will be displaced in a clockwise direction, whereas if the radius is decreased, the displacement of cam 62 will be in a counterclockwise direction. Of course, if the characteristics of the aircraft are such that the particular change in altitude results in no change in maximum allowable airspeed, data cam 60 will be so contoured that there will be no resulting change in its radius upon the rotation thereof brought about by the particular change in altitude in the manner hereinabove described. Consequently, cam follower 62 will not be displaced in either direction. Assuming that the characteristics of the aircraft at its altitude are such that a particular increase in altitude results in an increase in maximum allowable airspeed, data cam 60 will be so contoured that the rotation of shaft 58 will result in a decrease in the radius of data cam 60 at the point of contact thereof with cam follower 62. The cam follower 62 will therefore be displaced in a counterclockwise direction, which displacement will be converted through crank 64 to a counterclockwise rotation of shaft 66 and gear 68 mounted thereon. This in turn, will result in a clockwise rotation of gear 70, sleeve 72 and rod 74, thus causing a corresponding clockwise rotation of maximum allowable airspeed pointer 46 to thereby indicate a higher maximum allowable airspeed on indicia plate 44. Of course, if the aircraft characteristic at said altitude called for a reduction in maximum allowable airspeed for said increase in altitude, then the radius of data cam 60 at the point of contact with cam follower 62 would increase to yield the necessary indication of decreased maximum allowable airspeed.

To this point in the description of the operation of the device of FIG. 2, the operation is substantially identical to that described for the airspeed indicator in my copending application Ser. No. 603,079. A more detailed description, which is not deemed necessary to an understanding of the present invention, may be found in said application Ser. No. 603,079, the contents of which are hereby incorporated by reference.

It will be noted that the device of FIG. 2, in addition to being an airspeed (and maximum allowable airspeed) indicator, is also a mach indicator. Thus, continuing with the detailed description of that device, the counterclockwise rotation of shaft 58 causes an equal counterclockwise rotation of mach subdial 76 mounted thereon, as described above. This provides a mach reading through cut-out 78 by virtue of the indicia on subdial 76 in accordance with the well-known operation of this type of combined mach and airspeed indicator. In accordance with the present invention, at that altitude in flight where the maximum allowable airspeed characteristic of the aircraft becomes a direct or linear function of mach (point D or N in FIG. 8) peg 84 engages rod 74 to thereby rotate rod 74 and both sleeve 72 and maximum allowable airspeed pointer 46 attached thereto in a counterclockwise direction directly with the rotation of subdial 76. This rotation in turn results in a counterclockwise rotation of gear 70, mounted on sleeve 72, and a clockwise rotation of gear 68, intermeshed with gear 70. The clockwise rotation of gear 68 is transmitted through shaft 66 to cam follower 62, thereby disengaging cam follower 62 from contact with the surface of cam 60. The cam follower 62 will remain so disengaged by virtue of the foregoing interaction caused by the engagement of peg 84 and rod 74 until the aircraft's altitude is again reduced to that at which maximum allowable airspeed is other than a direct function of mach (point D or N of FIG. 8).

For simplicity of presentation, this aspect of the invention has been described in connection with a combined mach and airspeed indicator having a single cam in the maximum allowable airspeed pointer drive. It will be understood, however, that this feature can be incorporated in multiple cam instruments such as will be described in detail hereinafter in connection with the multiple cam aspects of the present invention. The feature is more easily adaptable for those aircraft in which the characteristics of the aircraft are such that the maximum allowable airspeed is a direct or linear function of mach over the same portion of the aircraft's flight (altitude) even in different services (cargo and passenger, for example). Of course with the provision of multiple locations for fastening the peg 84 along the periphery of subdial 76, as discussed above, the instrument could be adapted for different services even when the characteristics are different in this respect.

Referring now to FIG. 8, curve ABCDE is a typical maximum allowable airspeed curve for certain aircraft when used in passenger service. When such aircraft are converted to cargo service, the maximum allowable airspeed characteristic curve is changed, the new curve being illustrated by curve ABDE. The two curves differ only in the portion BD of the curve for cargo service, which corresponds to a lower maximum allowable airspeed for the altitude between points B and D when the aircraft is used in cargo service. In order to provide for such a change in the maximum allowable airspeed characteristics upon conversion from passenger to cargo service, I have provided in my above-mentioned application Ser. No. 603,079 stop means for preventing engagement of the cam follower 62 with the surface of data cam 60 at altitudes in flight between points B and D. The constant maximum allowable airspeed for cargo use between these two altitudes in flight will be reflected by failure of the maximum allowable airspeed pointer to move because cam follower 62 is held stationary by the stop means at these altitudes and the maximum allowable airspeed pointer 46 moves only in response to movement of the cam follower 62 (the relevant structure of the airspeed device of said application Ser. No. 603,079 being essentially that illustrated in FIG. 2, except that in the illustrated structure of that application there is no mach subdial 76 and no finger, or peg 84 to engage a rod 74 or the like. In the presently illustrated device, the finger 84 would be so positioned as not to come into contact with rod 74 until altitude D is reached in flight).

Referring again to FIG. 8, a different type of change in maximum allowable airspeed characteristic curve which can occur in conversion of an aircraft from one type of service to another is from curve ABCDE to curve LMNO. It will be appreciated that upon such a change in characteristics, the expedient of employing stop means, provided by my foregoing application, would not avail inasmuch as there is substantially no common portion in the two curves nor is there any straight line portion for one curve at a lower maximum allowable airspeed than for the other curve at corresponding altitudes. In accordance with one aspect of the present invention I have provided a construction for a maximum allowable airspeed instrument which permits taking into account the latter type of change in maximum allowable airspeed characteristics upon conversion from one service to another. This aspect of the invention will be better understood from the following detailed description taken in connection with FIGS. 3–7 of the attached drawings. As will be apparent from the following detailed description, this aspect of the invention resides in the provision of a plurality of data cams and means for selectively bringing a cam follower into operative engagement with the particular data cam which carries the data for the selected service in which it is desired to use the aircraft. For simplicity of presentation, this aspect of the invention will be described in connection with an airspeed instrument. It will be understood, however, that it could readily be applied to a more complex instrument, such as a combined mach and airspeed indicator, if desired, without departing from the invention.

Referring particularly to FIGS. 3, 3A, and 3B, there is herein illustrated one embodiment of my invention wherein two separate data cams 160 and 260 are mounted on sleeve 58 spaced apart from each other along the axis of sleeve 58. The data cams 160 and 260 are tailored, respectively, to reflect the maximum allowable airspeed characteristics for the aircraft at one or another of the intended services such as passenger and cargo service. As already mentioned, if the aircraft is to be used in more than two services, each of which has a unique maximum allowable airspeed characteristic, then an additional data cam to reflect each such unique characteristic is interposed along sleeve 58. A cam follower 162 is rotatably mounted on a crank 164 which is in turn mounted on a cylinder 100. Cylinder 100 is slidably mounted on rectangular shaft 166 which is offset from and parallel to sleeve 58. Of course, shaft 166 need not be rectangular so long as at least a portion of its surface is non-cylindrical so as to permit cylinder 80 to be slidable along the axis of shaft 166 and yet rotatable therewith upon rotation of shaft 166. Also mounted on shaft 166 is a gear 168 which is in turn connected in meshed relationship with a gear 170, if necessary for spatial considerations through a series of interconnecting gears (not shown). Gear 170 is in turn mounted on a sleeve 72, which, like sleeve 58, is coaxial with shaft 40 (not shown). The maximum allowable airspeed pointer 46 is also fixed to sleeve 72, being mounted on a rod 74 which is in turn mounted on sleeve 72.

Mounted on cylinder 100 is a segmental member 102. A lever 104 having a pair of fingers 106 at one end thereof for engaging segmental member 102 is pivotally mounted at the other end thereof on one end of a shaft 108, the other end of which shaft 108 is journaled in end bearings (not shown). A barrel cam 110 is mounted on a rotatable shaft 112, which shaft 112 is offset from and parallel to shaft 166 and sleeve 58. At one end of shaft 112 is a gear 113; the other end of shaft 112 is journaled in end bearings (not shown). Barrel cam 110 is provided with a transverse slot 114 which receives one end of a finger member 116, the other end of which finger 116 is pivoted on a projection 118 on lever 104. A cam follower 120 is mounted on a crank 122 which is in turn fixed to cylinder 100. A spring 180 biases shaft 166 counterclockwise so as to bias cam follower 162 against one of the data cams 160, 260 (in the illustration of FIG. 3, data cam 160) and at the same time bias cam follower 120 toward barrel cam 110. Mounted on a shaft 124, which is offset from and parallel to shaft 112, is a gear member 123 comprising, at one end thereof, a gear segment 125 and at the other end thereof a projection 126 for engaging stops 128 and 130. Gear segment 125 is intermeshed with gear 113 on shaft 112. Mounted at the free end of projection 126 are overcentering spring means 132. Mounted at one end of shaft 124 is a knob 134 bearing a pointer 135 which cooperates with an indicia plate 136. The other end of the shaft 124 is journaled in bearing means (not shown).

It will be understood that the device of FIGS. 3–3B operates to provide a maximum allowable airspeed reading in essentially the same manner as described above for the device of FIG. 2. That is, assuming again that altitude is being increased, the expansion of a static pressure capsule or the like will result in counterclockwise rotation of sleeve 58 and the data cams 160, 260 carried thereon by the means described in connection with FIG. 2, or by similar means. Assuming that the increase in altitude results in an increase in maximum allowable airspeed, then the radius of data cam 160 in contact with cam follower 162 will decrease, causing cam follower 162 and crank 164 to be displaced in a counterclockwise direction and resulting in a counterclockwise rotation of cylinder 100, shaft 166 and gear 168. The latter rotation is in turn converted into a clockwise rotation of gear 170 and sleeve 72, rod 74 and maximum allowable airspeed pointer 46 connected thereto.

When it is decided to change the service of the aircraft from passenger to cargo, it is necessary to disengage cam follower 162 from data cam 160, which is contoured for passenger service, and to bring said cam follower 162 into engagement with the surface of data cam 260, which is contoured to reflect the maximum allowable airspeed characteristics of the aircraft in cargo service. It will, of course, be understood that in this, as in all the embodiments of this invention and of that of my copending application Ser. No. 603,079, the same basic instrument can be manufactured for use in all types of aircraft, and only the data cams which can be made readily interchangeable, need be tailored for the specific aircraft on which the instrument is used.

To effect the transfer of cam follower 162 from engagement with cam 160 to engagement with cam 260 in accordance with this aspect of the present invention, knob 134 is rotated clockwise manually or by other suitable means. This clockwise rotation is in turn imparted to shaft 124 and gear member 123 connected thereto and operates against the action of overcentering spring means 132 until projection 126 is almost half-way between stops 128 and 130, at which point the overcentering spring 132 serves to bias projection 126 of gear member 123 toward stop 130 to assure completion of the clockwise turning and the consequent transfer of cam follower 162 as described in detail below. Any conventional overcentering spring means may be employed, one type of such means being described hereinafter in connection with the embodiment of FIGS. 4–7. The clockwise rotation of gear segment 125 of gear member 123 causes a counterclockwise rotation of intermeshed gear 113 and consequently of shaft 112 and barrel cam 110.

As barrel cam 110 rotates counterclockwise, cam follower 120 comes into contact with an elevation 121 on barrel cam 110 (see FIGS. 3A and 3B), and is displaced, together with crank 122, in a clockwise direction which clockwise rotation continues with increasing radius of projection 121 and until the radius thereof in contact with cam follower 120 begins to decrease whereupon the direction of displacement reverses, as will be seen hereinafter. This clockwise displacement of cam follower 120, in turn, causes a clockwise rotation of cylinder 100 together with shaft 166, thereby causing a clockwise rotation of crank 164 and cam follower 162 to lift cam follower 162 off the surface of data cam 160.

At the same time, the counterclockwise rotation of barrel cam 110 effects a rightward displacement of finger member 16 within slot 114. This displacement is in turn converted into a clockwise rotation of lever 104 about shaft 108, which rotation causes fingers 106 to engage segmental member 102 of cylinder 100 to thereby slide cylinder 100 rightward along shaft 166. The counterclockwise rotation of barrel cam 110 continues until lever 104 has rotated from the illustrated solid line portion to the illustrated dotted line portion, at which point cam follower 162 is opposite data cam 260. By this time cam follower 120 is in contact with a portion of elevation 121 of barrel cam 110 whereon the radius is decreasing to thereby cause a counterclockwise displacement of cam follower 120, lever 122, cylinder 100, lever 164 and cam follower 162, which counterclockwise rotation continues until cam follower 162 engages the surface of data cam 260. At this point, the counterclockwise rotation of barrel cam 110 is completed, and projection 126 of gear member 123 engages stop 130. The instrument is now ready for operation in cargo service. Of course, when the aircraft is reconverted to passenger service, the cam follower 162 is disengaged from data cam 260 and returned to engagement with data cam 160 by reversing the foregoing operation, that is by turning knob 134 counterclockwise to cause a clockwise rotation of barrel cam 110, and initial clockwise rotation of cylinder 100 to lift the cam follower 162 off data cam 260, a leftward displacement of finger 116 within slot 114 to cause a leftward displacement of cylinder 100 along shaft 166 until cam follower 162 is aligned with data cam 160, and a counterclockwise rotation of cylinder 100 to bring cam follower 162 into engagement with the surface of data cam 160, at which point projection 126 is in engagement with stop 128 and the conversion has again been completed. The indicia plate 136 may bear indicia indicating passenger and freight modes, such as, for example, the illustrated P and F of FIG. 3. Pointer 135 will, of course, point to the appropriate marking to inform the pilot of the mode of operation for which the instrument is set.

Turning now to FIGS. 4–7, there is here illustrated a portion of a combined mach and airspeed instrument embodying another dual-cam embodiment of the present invention. In this embodiment, the position of one of the data cams, rather than that of the cam follower, is changed in order to adapt the instrument to a change from passenger to cargo service. For simplicity of description, the mach subdial is not shown.

Figure 5:
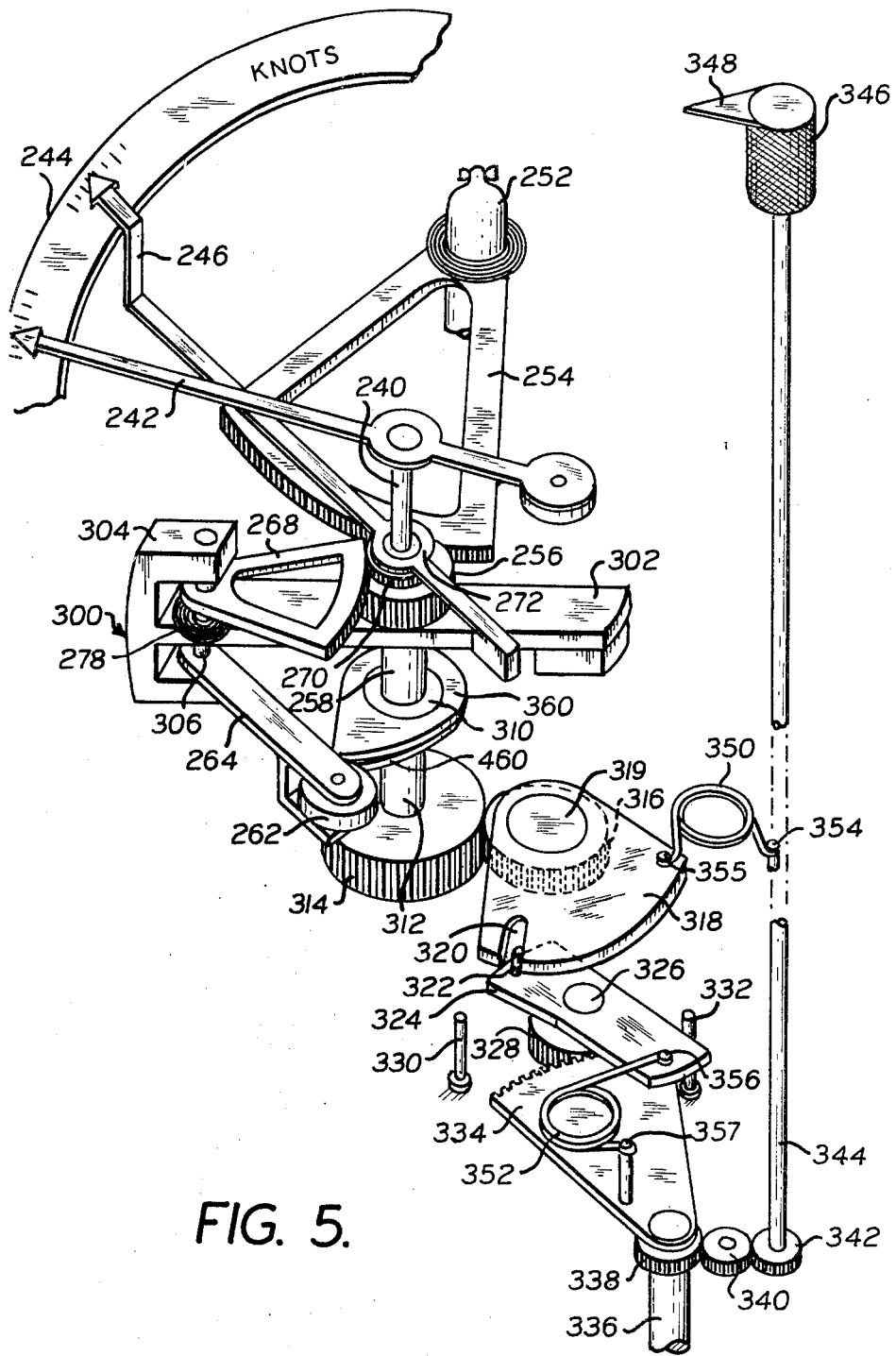
FIG. 5 is a perspective view of the mechanism of FIG. 4.

Referring particularly to FIG. 5, on an airspeed shaft 240, which is connected to a conventional drive from an airspeed capsule (not shown) is mounted an airspeed pointer 242 for cooperating with an indicia plate 244 to provide an airspeed reading by rotation of said airspeed pointer 242 relative to said indicia plate 244 responsive to changes in airspeed of the aircraft.

Also associated with indicia plate 244 is maximum allowable airspeed pointer 246 which is driven by an altitude capsule (not shown) through means including a shaft 252 on which is mounted a sector gear 254. Sector gear 254 is intermeshed with a gear 256 mounted on a sleeve 258 which is concentric with shaft 240 and which drives the mach subdial (not shown). Fixed to sleeve 258 and rotatable therewith is a cam follower support 300 comprising a lever 302 and a C shaped end bracket means 304. Journaled in bracket 304 is a shaft 306 which is offset from and parallel to sleeve 258 and shaft 240. A crank 264 having a cam follower 262 mounted on the free end thereof is fixed to shaft 306. Also fixed to shaft 306 is a sector gear 268 which is intermeshed with a gear 270 on a sleeve 272 which is concentric with shaft 240 and sleeve 258 and which sleeve 272 has mounted thereon maximum allowable airspeed pointer 246. Spring 278 serves to bias cam follower 262 against the surface of one of the data cams 360 and 460.

Fixed to a stationary support 310 concentric with sleeve 258 and shaft 240 is the stationary data cam 360. The movable data cam 460 is secured below stationary data cam 360 on a shaft 312 which is preferably coaxial with sleeve 258. Fixed to shaft 312 is a gear 314 which is intermeshed with a gear 316 which is in turn fixed to a sector 318 having an elongated cut-out portion 320. Gear 316 and sector 318 pivot about a fixed pin 319. Interposed in cut-out 320 is a pin 322 mounted on one end of a lever 324. Lever 324 is rotatably mounted on a shaft 326 to which is fixed a gear 328. Stops 330, 332 limit the rotational movement of lever 324 to thereby delimit the extended and retracted positions of movable cam 460, as will be explained in detail hereinafter.

Fixed to a shaft 336 is a sector gear 334 which is intermeshed with gear 328. Mounted concentrically with shaft 336 is a gear 338 which is intermeshed with a gear 340 which is in turn intermeshed with a gear 342. Gear 342 is mounted concentrically on one end of a selector shaft 344, the other end of which is fixed to a selector knob 346 in the control panel of the aircraft. Knob 346 carries an indicator or pointer 348 for cooperation with "passenger" and "cargo" indicia on the control panel (not shown). A pair of toggle springs 350, 352 is provided to bias the mechanism toward the selected one of the fully extended or the fully retracted position of movable cam 460, as will be explained in greater detail hereinafter. In the illustration, one end 354 of toggle spring 350 is anchored to the support of the mechanism and the other end 355 thereof is anchored to sector 318. One end 356 of toggle spring 352 is fixed to the end of lever 324 remote from pin 322, the other end 357 of spring 352 being fixed to sector gear 334.

The operation of the airspeed pointer is conventional and has already been summarized above. The operation of the maximum allowable airspeed pointer mechanism is somewhat different from that of the previously described embodiment, although the end result is, of course, the same. In the operation of the present embodiment, shaft 252 is rotated in response to changes in altitude by a conventional drive from an altitude capsule (not shown) such as that illustrated in FIG. 2. Assuming an increase in altitude, shaft 252 will be rotated clockwise, which rotation will in turn be translated through gears 254 and 256 into a counterclockwise rotation of cam follower support 300 about the axis of sleeve 258. This in turn will impart a counterclockwise rotation to crank 264 about the axis of sleeve 258 to cause cam follower 262 to ride counterclockwise along the surface of one of the data cams 360, 460. Depending on whether the effective radius of the cam increases or decreases at the point of contact with cam follower 262, this will in turn cause a counterclockwise or clockwise movement of cam follower 262, crank 264 and shaft 306 about the axis of shaft 306. I employ the term "effective radius" herein to analogize with the description hereinabove in connection with the operation of the previously described embodiments. Actually in the present embodiment, with a constant radius on the data cam, the maximum allowable airspeed pointer 246 would rotate over the airspeed dial at the same speed as the mach subdial if altitude is changed. Therefore in order to have a constant maximum allowable airspeed pointer indication, the data cam radius must decrease at a rate depending upon the length of crank 264 and the gear ratio of gears 268 and 270. In order to obtain an increase of the maximum allowable airspeed pointer indication, the rate of decrease on the data cam radius must go beyond the amount of decrease mentioned before when the maximum allowable airspeed pointer does not move with increasing altitude. It is this change of cam radius in addition to that required to maintain a constant maximum allowable airspeed reading which is meant by reference to change in "effective radius." Thus wherever reference is made to change in radius of the data cam in the present specification and claims it is intended to mean this change in effective radius. Of course, for a data cam such as cam 60, the two terms are identical in any event. Assuming that maximum allowable airspeed increases with the postulated increase in altitude, the data cam will be so contoured that the effective radius thereof will decrease at the point of contact with cam follower 262. This will result in a counterclockwise displacement of cam follower 262 about the axis of shaft 306 which will be translated through crank 264 into a counterclockwise rotation of shaft 306. This counterclockwise rotation will be converted through gears 268 and 270 into a clockwise rotation of shaft 272 and maximum allowable airspeed pointer 246.

Assuming that the aircraft has been in cargo service and that fixed data cam 360 is contoured to reflect the maximum allowable airspeed characteristics of the aircraft in passenger service and the movable data cam 460 is contoured for use in cargo service, the movable data cam 460 (the cargo mode cam) will have been in the extended position illustrated in FIG. 6 so as to have its periphery in engagement with cam follower 262. If it is desired to convert to passenger service, then data cam 460 is moved from its extended to its retracted position so as to have the periphery of cam 360 (the passenger mode cam) in engagement with cam follower 262 as illustrated in FIG. 7. This is accomplished by operation of the selector mechanism illustrated in FIGS. 4 and 5. To initiate this, selector knob 346 is turned counterclockwise until indicator 348 is turned from the cargo to the passenger position indicated on the control panel (not shown). This counterclockwise rotation is converted through shaft 344 and gears 342, 340 and 338 into a counterclockwise rotation of sector gear 334. This in turn causes a clockwise rotation of gear 328, shaft 326 and lever 324. The clockwise rotation of lever 324 urges sector 318 to rotate in a counterclockwise direction. This counterclockwise rotation of sector 318 is converted through gears 316 and 314 into a clockwise rotation of sleeve 312 and data cam 460 mounted thereon to thereby cause the retraction of data cam 460. When data cam 460 is in the fully retracted position, the left hand face of lever 324 will be in contact with stop 330 to thereby limit further rotational movement.

Overcentering toggle springs 350 and 352 serve to assure completion of the selection operation and to assure maintenance of movable cam 460 in the selected position. Thus, during the first half of the selection operation all of the rotations initiated by the rotation of selector knob 346 work against the force of the toggle springs 350 and 352 which are in a first bi-stable position. As the rotation approaches the halfway mark, the cross-over springs assume an unstable position wherein the anchors 354 and 355 of toggle spring 350 and the anchors 356 and 357 of toggle spring 352 are aligned respectively with their associated pivots 319 and 326, these springs 350 and 352 thus being in an unstable position. Thereupon, further rotation in the same direction causes these springs to snap over into a second bi-stable position to thereby urge the mechanism into completion of the rotation in the desired direction. That is, lever 324 will be urged clockwise towards stop 330 once this halfway point has been passed by the action of toggle spring 352, and sector 318 will be urged counterclockwise by the assumption of the second bi-stable position of toggle spring 350.

Obviously, to return data cam 460 to the extended position, the foregoing procedure is repeated in the opposite direction. Further, the particular over-centering arrangement, although presently preferred, may be replaced by another form of over-centering arrangement and could be dispensed with entirely.

While the description has been with reference to a moving pointer and a stationary dial, it is obvious that a dial face could be rotated by the mechanical linkage from the static pressure capsule relative to a stationary pointer or other indicia means.

While I have herein shown and described several preferred forms of the invention and have suggested modifications therein, other modifications may be made therein within the scope of the appended claims without departing from the spirit and scope of this invention.

What I claim is:

1. In a device for continually indicating maximum allowable airspeed for an aircraft having more than one maximum allowable airspeed characteristic which varies as a function of an external parameter, each of said characteristics being appropriate for a given mode of use of said aircraft, said device comprising
   a dial face having indicia thereon;
   a maximum allowable airspeed pointer adapted to move relative to said dial face;
   external parameter sensing means; and
   motive means connecting said sensing means with said pointer for moving said pointer in response to a change in said external parameter to indicate the maximum allowable airspeed for said aircraft at said changed parameter, said motive means comprising
      a first shaft connected to said sensing means and rotatable in response to a change in a condition of said sensing means;
      a second rotatable shaft;
      means connecting said pointer to said second shaft for concomitant rotation therewith; and
      driving means for drivingly connecting said first shaft to said second shaft for rotating the latter in response to rotation of the former, the improvement wherein said driving means comprises data cam means including a plurality of differently contoured cam surfaces, each of said cam sufaces being contoured for a different maximum allowable airspeed characteristic of said aircraft, a data cam follower, and means for biasing said data cam follower into engagement with a cam surface of said data cam means, said device further including cam selecting means for selectively bringing said cam follower into engagement with each of said cam surfaces.

2. The device of claim 1 wherein said parameter is altitude and said sensing means is altitude sensing means.

3. The device of claim 2 wherein said altitude sensing means is a static pressure capsule.

4. The device of claim 2 which is incorporated in an air speed indicator, said dial face being the dial face of said airspeed indicator.

5. The device of claim 2 which is incorporated in a combined mach and airspeed indicator, said dial face being the dial face of a combined mach and airspeed indicator.

6. The device of claim 4 wherein said airspeed indicator includes an airspeed pointer, airspeed sensing means and means connecting said airspeed pointer to said airspeed sensing means for moving said airspeed pointer relative to said dial face in response to changes in airspeed, said airspeed pointer connecting means including an airspeed shaft; and wherein said first and second shafts are mounted on and coaxial with said airspeed shaft.

7. The device of claim 1 wherein said data cam means comprises a plurality of disc cams mounted on said first shaft for rotation therewith and said data cam follower is displaced in response to rotation of said data cam means, said device further including means connecting said data cam follower to said second shaft for rotating said second shaft in response to said displacement of said data cam follower.

8. The device of claim 7 wherein said cam means comprises a pair of said disc cams mounted in spaced apart relationship on said first shaft, said cam selecting means comprising a third shaft offset from and parallel to said first shaft means for mounting said data cam follower on said third shaft for slidable movement along said third shaft between a first position wherein said data cam follower is in operative engagement with one of said cams and a second position wherein said data cam follower is in operative engagement with the other of said cams, said cam follower mounting means being rotatable with said third shaft, and motive means for selectively moving said cam follower mounting means between said first and second positions.

9. The device of claim 8 wherein said motive means comprises a barrel cam having first and second camming means said first camming means cooperating with said cam follower mounting means for moving said data cam follower out of engagement with one of said data cams at the beginning of said selection operation and for moving said data cam follower into engagement with the other said data cam at the end of said selection operation, and said second camming means cooperating with said cam follower mounting means for laterally displacing said mounting means along said third shaft between said two positions.

10. The device of claim 1 wherein said data cam means comprises a plurality of disc cams mounted parallel to each other, said device further including means for moving at least one of said disc cams in the plane of said disc cams between a relatively extended position for engagement thereof with said data cam follower and a relatively retracted position in which said cam follower will engage another of said disc cams, means for connecting said data cam follower to said first shaft for moving said follower over the periphery of the extended cam in response to rotation of said first shaft, whereby said data cam follower is displaced laterally in the plane of the extended data cam in accordance with the contour of the periphery of said extended data cam, said device further including means connecting said data cam follower to said second shaft for rotating said second shaft in response to said lateral displacement of said data cam follower.

11. The device of claim 10, wherein said cam moving means includes overcentering toggle means for selectively biasing said movable cam into each of its extended and its retracted positions.

12. The device of claim 10 wherein said data cam means comprises a pair of said disc cams, the first of said disc cams being fixed concentrically with said first shaft, the second of said disc cams being mounted concentrically with and adjacent to said first disc cam and being rotatable between said extended position wherein the cam surface thereof extends beyond the cam surface of said first cam and said retracted position wherein the cam surface of said first cam extends beyond that of said second cam, said cam moving means comprising a selector knob rotatable between first and second positions corresponding respectively to said extended and retracted positions of said second cam, and means for connecting said selector knob with said second cam for moving said second cam into and out of said extended and retracted positions in response to movement of said selector knob into and out of its corresponding positions.

13. The device of claim 12, wherein said last-mentioned connecting means includes a first overcentering toggle means for selectively biasing said selector knob into each of its first and second positions, and a second overcentering toggle means for biasing said second cam into said extended and said retracted positions, and means for connecting said first toggle means to said second toggle means for operating said second toggle means to bias said second cam into its extended and retracted positions in response to the operation of said first toggle means to bias said knob into its first and second positions, respectively.

14. The device of claim 13 further comprising stop means for limiting the rotation of said second data cam to said extended and retracted positions.

15. In a device for continually indicating maximum allowable airspeed for an aircraft having a maximum allowable airspeed characteristic which varies as a function of an external parameter, said device comprising a dial face having indicia thereon;

a maximum allowable airspeed pointer adapted to move relative to said dial face;

external parameter sensing means; and motive means connecting said sensing means with said pointer for moving said pointer in response to a change in said external parameter to indicate the maximum allowable airspeed for said aircraft at said changed parameter, said motive means comprising a first shaft connected to said sensing means and rotatable in response to a change in a condition of said sensing means;

a second rotatable shaft;

driving means connecting said pointer to said second shaft for concomitant rotation therewith; and means for connecting said first shaft to said second shaft for rotating the latter in response to rotation of the former, said last mentioned means comprising data cam means, a data cam follower, and means for biasing said data cam follower into engagement with a face of said cam means, said cam means including a cam surface contoured in accordance with the relationship between maximum allowable airspeed and said external parameter for said aircraft in a particular service, the improvement wherein said device further includes a peg,
means for connecting said peg to said first shaft for rotation therewith,
said peg and said pointer driving means being relatively disposed for mutual operative engagement when said maximum allowable airspeed is a linear function of mach
whereby said maximum allowable airspeed pointer rotates at the same angular velocity as said peg when the maximum allowable airspeed is a linear function of mach.

16. The device of claim 15 wherein said means connecting said peg to said first shaft comprises a mach subdial, said peg being mounted on said subdial and extending therefrom into the path of movement of said pointer driving means.

References Cited

UNITED STATES PATENTS 3,435,675  4/1969  Knapp --------------- 73—182

DONALD O. WOODIEL, Primary Examiner